Oct. 20, 1931.    H. J. DIVEKEY    1,828,104

DRINKING APPARATUS FOR POULTRY

Filed Sept. 24, 1930

Inventor,
Harvey J. Divekey,
Benj. T. Goodhouse Atty.

Witness:
Chas. R. Nourse.

UNITED STATES PATENT OFFICE

HARVEY J. DIVEKEY, OF AURORA, ILLINOIS, ASSIGNOR TO ILLINOIS SUPPLY COMPANY, OF AURORA, ILLINOIS, A COPARTNERSHIP COMPOSED OF HARVEY J. DIVEKEY, WILLIAM M. WILLETT, SR., AND WILLIAM M. WILLETT, JR.

DRINKING APPARATUS FOR POULTRY

Application filed September 24, 1930. Serial No. 484,060.

My present application relates to improvements in drinking apparatus for poultry. The prime requisite of such an apparatus is that it shall be so simple and sturdily constructed as to permit easy, frequent and thorough cleaning, as clean drinking water is one of the most important factors in the health and growth of the birds.

It is also desirable to provide facilities for heating the drinking water as it seems to be now well settled that providing the fowls with heated drinking water secures desirable results.

I have attained the foregoing objects, including simplicity and economy of construction, by means of the structure illustrated in the accompanying drawings in which—

Similar reference characters refer to similar parts throughout the respective views.

Figure 1:
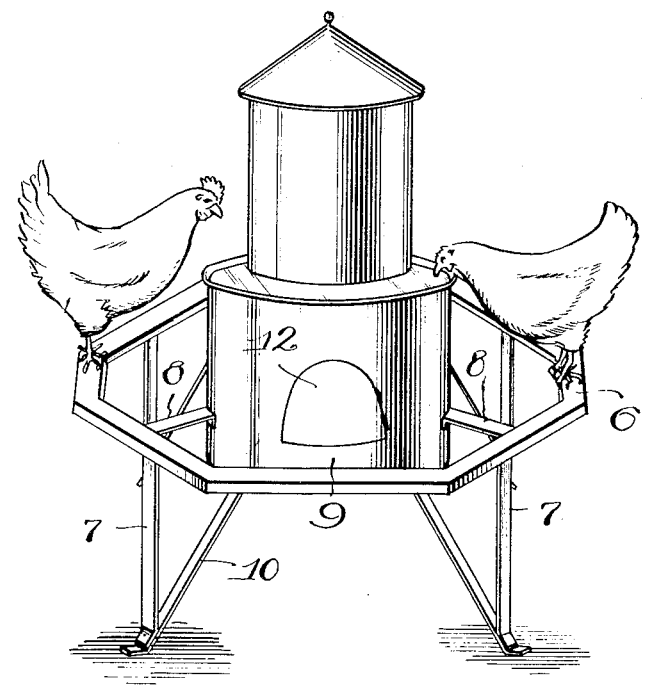
Fig. 1 is a perspective of a drinking apparatus for poultry embodying my invention.

The drinking apparatus is supported a desired distance from the ground upon a frame work comprising an annular or polygonal shelf or perch 6, to which are secured and from which depend legs 7. Straps 8 extend inwardly from the perch or shelf 6 to the lower relatively larger member 9 of the drinking apparatus and diagonal straps 10 extend from the bottoms of the legs 7 also to the member 9, thereby securely holding the member 9 centrally of and spaced a desired distance from the shelf or perch 6.

Figure 2:
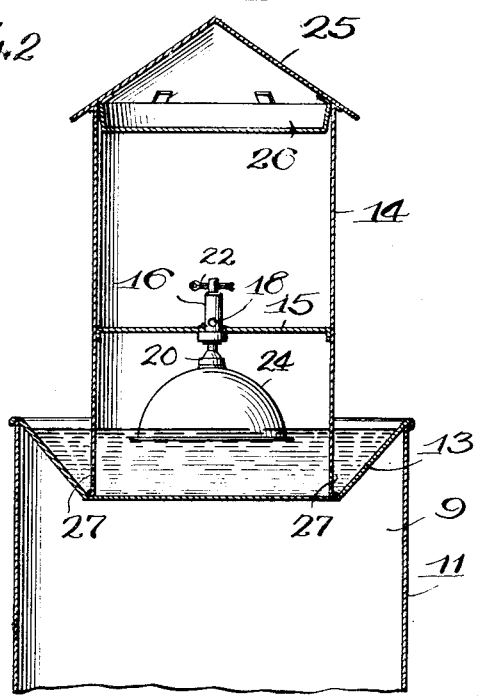
Fig. 2 is a fragmental vertical central section through the reservoir and drinking basin supplied therefrom.
Figure 4:
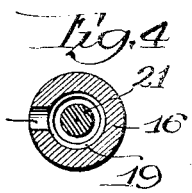
Fig. 4 is a section on line 4—4 of Fig. 3, looking in the direction of the arrows.
Figure 3:
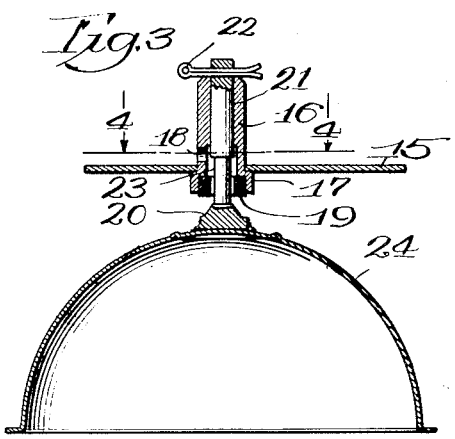
Fig. 3 is a central vertical section through the float and valve.

The lower relatively larger member 9 of the drinking apparatus has vertical, cylindrical, or polygonal, if desired, side walls 11, in which is a door 12 for inserting a lamp or other desired means for warming the drinking water. The top of the member 9, as clearly shown in Fig. 2, is of inverted, truncated, conical form, or otherwise dished to extend downwardly into the member 9.

Seated in the top 13 of the member 9 is a reservoir 14, also of a cylindrical or polygonal form and of a reduced diameter with respect to the member 9 so as to leave the conical or dished portion of the top 13 uncovered, thereby providing a trough from which the fowls may drink. A suitable distance above the bottom of the reservoir 14 I provide a horizontal partition 15 through a central perforation in which extends and is secured a valve casing 16. This valve casing is extremely simple and comprises a straight cylindrical tubular portion extending upwardly through the perforation in the partition 15 with an annular shoulder or an enlargement 17 on the bottom thereof, the top of which abuts the bottom face of the partition 15. At a point above the partition 15 is provided a lateral port 18 affording communication between the outside of the casing and the interior bore. The interior bore of the enlarged portion 17 is also enlarged to receive a valve seat 19 consisting preferably of rubber, or some other soft material uneffected by water. The valve 20 is conical and is carried upon a valve stem 21 of a size to move easily in the central bore of the valve casing 16. The stem is extended so as to project through the top of the valve casing 16 and is transversely bored or perforated adjacent its top to receive a cotter pin or other retaining device 22. The lower portion of the valve stem is reduced, as at 23, from a point adjacent the lateral port 18 to the valve 20, so that when the valve 20 is below the seat 19, that is, not seated thereon, a trickle of water flows through the lateral port 18 by the reduced portion 23 of the valve stem and through the valve seat 19.

Soldered to the lower face of the valve 20 is a semi-spherical float cup 24. The size of the float cup and position of the partition 15 is such that when the water has risen a desired distance in the drinking trough of the top 13 the float will seat the valve 20 upon the seat 19 and prevent water from flowing from the reservoir until the fowls have drunk sufficient of the water to permit the float to descend and release the valve 20 from the seat 19.

The top of the reservoir 14 is closed preferably by a pyramidal top 25 provided with a downwardly projecting collar 26 having a snug fit with the top of the reservoir 14.

So far as I am aware float feeds for drinking apparatus for poultry have heretofore comprised a ball or complete sphere co-operating with a lever operated valve, which is much more expensive to manufacture and is considerably more liable to derangement than the construction herein illustrated and described.

The reservoir 14 may be separate or removable from the dished top 13 of the member 9, or may be soldered therein, and perforations 27 are provided adjacent the bottom of the reservoir for establishing communication between the interior of the reservoir and the periphery of the top 13 which constitutes the drinking trough for the fowls. The only part of my structure which is at all likely to need renewal, and that at infrequent intervals, is the valve seat 19, which is small and of negligible expense.

The removal of the cover 25 permits the reservoir to be scrubbed and flushed and the drinking trough may be equally easily scrubbed and flushed, so that it is evident that I have provided an extremely simple structure not at all likely to get out of order, which may be easily kept in perfect sanitary condition.

Having described my invention what I claim as new and desire to secure by Letters Patent is:

1. A drinking apparatus for poultry comprising a perch and standards for holding the same a suitable distance above the ground, a casing secured centrally of and spaced from said perch, an inverted, truncated, conical top for said casing, a reservoir seated in said top, a transverse partition in said reservoir having a central perforation therein, a tubular valve casing extending through said perforation, said valve casing having an annular interior recess in its lower end, a removable valve seat located in said annular recess, a valve stem extended through said casing, a removable pin extending through said valve stem for preventing the downward withdrawal thereof from said casing, a valve secured to the lower end of said stem and a semi-spherical float cup secured to the lower surface of said valve.

2. In a drinking apparatus for poultry, a receptacle of inverted, truncated, conical form, a reservoir seated centrally of said receptacle and having communication at its lower portion with the surrounding portion of said receptacle, a transverse partition in said reservoir having a perforation therein, a sleeve disposed in said perforation, a stem reciprocably mounted in said sleeve, a valve co-operating with the lower end of said sleeve carried by said stem and a semi-spherical float cup secured to said valve.

3. In a drinking apparatus for poultry a dished receptacle, a reservoir of less diameter seated centrally of said receptacle and having communication at its lower portion with the surrounding portion of said receptacle, a transverse partition in said reservoir having a perforation therein, a sleeve disposed in said perforation, a stem reciprocably mounted in said sleeve, a valve co-operating with said sleeve and carried by said stem and a float in co-operative relation with said valve.

4. In a drinking apparatus for poultry a dished receptacle, a reservoir of less diameter seated centrally of said receptacle and having communication at its lower portion with the surrounding portion of said receptacle, a transverse partition in said reservoir having a perforation therein, a sleeve disposed in said perforation, a stem reciprocably mounted in said sleeve, a valve co-operating with said sleeve and carried by said stem and an inverted hollow form constituting a float in co-operative relation with said valve.

HARVEY J. DIVEKEY.